United States Patent
Dalal et al.

(10) Patent No.: US 9,998,469 B2
(45) Date of Patent: *Jun. 12, 2018

(54) MEDIA LIST FOR TRAVEL

(71) Applicant: International Business Machines Corporation, Armonk, NY (US)

(72) Inventors: Keyur D. Dalal, Johns Creek, GA (US); Galina Grunin, Briarcliff Manor, NY (US); Rick A. Hamilton, II, Charlottesville, VA (US); Alan W. Newman, New Orleans, LA (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/697,933

(22) Filed: Sep. 7, 2017

(65) Prior Publication Data

US 2018/0069863 A1    Mar. 8, 2018

Related U.S. Application Data

(63) Continuation of application No. 15/259,438, filed on Sep. 8, 2016.

(51) Int. Cl.
*H04L 29/06* (2006.01)
*G06Q 10/02* (2012.01)
*H04L 29/08* (2006.01)

(52) U.S. Cl.
CPC ............ *H04L 63/10* (2013.01); *G06Q 10/02* (2013.01); *H04L 63/08* (2013.01); *H04L 65/4084* (2013.01); *H04L 67/12* (2013.01)

(58) Field of Classification Search
CPC ..... H04L 63/10; H04L 63/08; H04L 65/4084; H04L 67/12; G06Q 10/02
See application file for complete search history.

(56) References Cited

U.S. PATENT DOCUMENTS 5,913,039 A    6/1999   Nakamura et al.
5,973,722 A    10/1999  Wakai et al.
(Continued)

FOREIGN PATENT DOCUMENTS

WO    2005120068 A2    12/2005
WO    2006062641 A3    6/2006
WO    2007145950 A2    12/2007

OTHER PUBLICATIONS

1 Mell, et al.; "The NIST Definition of Cloud Computing"; NIST; Special Publication 800-145; Sep. 2011; 7 Pages.
(Continued)

*Primary Examiner* — Oleg Korsak
(74) *Attorney, Agent, or Firm* — Edward J. Wixted, III

(57) ABSTRACT

In an approach for sending a media list to a transportation vehicle for a user, a processor determines a media list for travel for a user, wherein the media list includes at least one media content item, and wherein the media list has associated access credentials that are set by the user. A processor receives a travel reservation for the user, wherein the travel reservation includes, at least, a departure location and a destination location. A processor determines a transportation vehicle associated with the travel reservation. A processor receives the access credentials to the media list. A processor uses the access credentials to access the media list. A processor send the media list to the transportation vehicle, wherein the media list is associated with the user, and wherein the media list is accessible to the user.

1 Claim, 3 Drawing Sheets

(56) References Cited

U.S. PATENT DOCUMENTS

| | | | |
|---|---|---|---|
| 6,014,381 | A | 1/2000 | Troxel et al. |
| 7,100,187 | B2 | 8/2006 | Pierzga et al. |
| 7,412,532 | B2 | 8/2008 | Gondhalekar et al. |
| 7,610,602 | B2 | 10/2009 | Ficco |
| 8,947,266 | B2 | 2/2015 | Stoll et al. |
| 2010/0162325 | A1 | 6/2010 | Bonar |
| 2013/0074111 | A1 | 3/2013 | Hyde et al. |
| 2013/0117338 | A1 | 5/2013 | Lynch et al. |
| 2014/0215022 | A1 | 7/2014 | Baset et al. |
| 2014/0309870 | A1* | 10/2014 | Ricci .................. H04W 48/04 701/36 |
| 2016/0309209 | A1 | 10/2016 | Lieu et al. |

OTHER PUBLICATIONS

"How to Stream"; © Delta Air Lines; 2015; Printed May 13, 2016; 2 Pages; <http://www.delta.com/content/www/en_US/traveling-with-us/onboard-experience/delta-studio/how-to-stream.html>.
Dalal et al., "Media List For Travel", U.S. Appl. No. 15/259,438, filed Sep. 8, 2016, 25 pages
IBM Appendix P, "IBM List of Patents Treated As Related, Appendix P", Dated Sep. 7, 2017, 2 pages.

* cited by examiner

MEDIA LIST FOR TRAVEL

BACKGROUND

The present invention relates generally to the field of traveling entertainment, and more particularly to sending a media list to a transportation vehicle for a user.

In-flight entertainment refers to the entertainment available to aircraft passengers during a flight.

Streaming media is multimedia that is constantly received by and presented to an end-user while being delivered by a provider. The term "to stream" refers to the process of delivering media in this manner; the term refers to the delivery method of the medium, rather than the medium itself and is an alternative to file downloading.

Airlines have made great strides in delivering electronic conveniences in recent years. Two comforts provided to passengers have been aided by governmental decisions. Small handheld electronics can now be operated below 10,000 feet, and government decisions and market forces have driven the increasing commonality of Wi-Fi onboard flights when flying over land.

More recently, in-flight streaming has been introduced. In-flight streaming allows preselected movies to be streamed to a passenger's mobile device. During in-flight streaming, passengers are limited to the airlines' choice of movies, while draining the passengers' batteries on the mobile devices.

SUMMARY

Aspects of an embodiment of the present invention disclose a method, computer program product, and computing system for sending a media list to a transportation vehicle for a user. A processor determines a media list for travel for a user, wherein the media list includes at least one media content item, and wherein the media list has associated access credentials that are set by the user. A processor receives a travel reservation for the user, wherein the travel reservation includes, at least, a departure location and a destination location. A processor determines a transportation vehicle associated with the travel reservation. A processor receives the access credentials to the media list. A processor uses the access credentials to access the media list. A processor send the media list to the transportation vehicle, wherein the media list is associated with the user, and wherein the media list is accessible to the user.

DETAILED DESCRIPTION

Embodiments of the present invention recognize that video options for an airline passenger (i.e., a user) are limited. Currently, if a passenger wants to watch a movie, the choices are: (a) download the movie to a personal device (e.g., computer, mobile phone) and watch the movie on the personal device; or (b) accept the movie selections offered by the airline. The former provides flexibility, but is often an inconvenience, namely batteries are drained and computer usage is generally physically restrained by seat backs, meal service, and other environmental restraints. Embodiments of the present invention allow a user to specify a travel queue (i.e., media list) on a video streaming service and have the media list made available to the user while in-flight. Additionally, embodiments of the present invention send a media list to a transportation vehicle for a user.

Embodiments of the present invention will now be described in detail with reference to the Figures.

Figure 1:
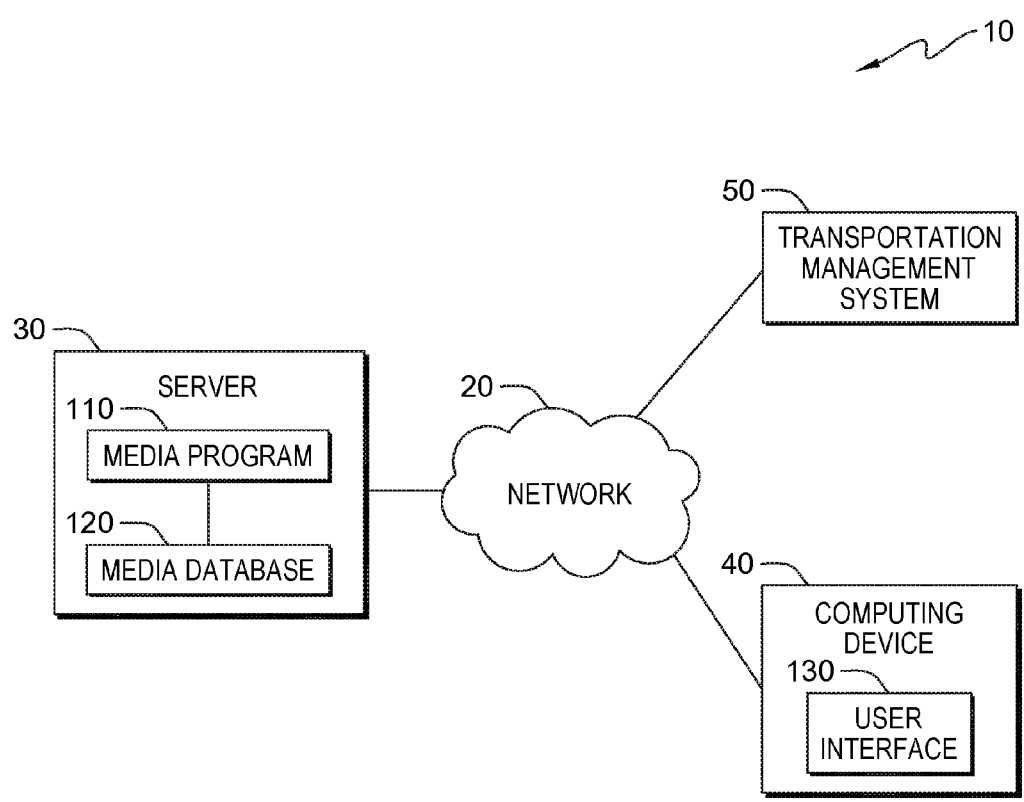
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes server 30, computing device 40, and transportation management system 50 interconnected over network 20. Network 20 may be a local area network (LAN), a wide area network (WAN) such as the Internet, a cellular data network, any combination thereof, or any combination of connections and protocols that will support communications between server 30, computing device 40, and transportation management system 50, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with computing device 40 and transportation management system 50 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. In the depicted embodiment, server 30 contains media program 110 and database 120. In other embodiments, server 30 may include media program 110, database 120, and/or other components, as depicted and described in further detail with respect to FIG. 3.

Computing device 40 may be a desktop computer, laptop computer, netbook computer, or tablet computer. In general, computing device 40 may be any electronic device or computing system capable of processing program instructions, sending and receiving data, and communicating with server 30 and transportation management system 50 via network 20. In the depicted embodiment, computing device 40 contains user interface 130. In other embodiments, computing device 40 may include user interface 130 and/or other components, as depicted and described in further detail with respect to FIG. 3.

Transportation management system 50 may be a management server, a web server, or any other electronic device or computing system capable of processing program instructions and receiving and sending data. In some embodiments, transportation management system 50 may be a laptop computer, tablet computer, netbook computer, personal computer (PC), a desktop computer, or any programmable electronic device capable of communicating with server 30 and computing device 40 via network 20. In other embodiments, transportation management system 50 may represent a server computing system utilizing multiple computers as a server system, such as in a cloud computing environment. In another embodiment, transportation management system 50 represents a computing system utilizing clustered computers and components to act as a single pool of seamless resources. In some embodiments, transportation management system 50 contains information, such as, for example, user media content lists and user flight reservations. In other embodiments, transportation management system 50 may include multiple components, as depicted and described in further detail with respect to FIG. 3.

Additionally, transportation management system 50 may host a flight reservation platform, airline flight management platform, flight video streaming content management platform, or airline video streaming platform.

User interface 130 may be any user interface used to access information from server 30 and transportation management system 50, such as information gathered and/or produced by media program 110. In some embodiments, user interface 130 may be a generic web browser used to retrieve, present, and negotiate information resources from the Internet. In other embodiments, user interface 130 may be a software program or application that enables a user at computing device 40 to access server 30 and transportation management system 50 over network 20. In the depicted embodiment, user interface 130 resides on computing device 40. In other embodiments, user interface 130, or similar user interfaces, may reside on another computing device, another server, or server 30, provided that user interface 130 is accessible to media program 110.

Media program 110 sends a media list to a transportation vehicle for a user. In doing so, media program 110 determines a media list for travel for a user. Media program 110 receives a travel reservation for the user. Media program 110 receives access credentials to the media list. Media program 110 sends the media list to a transportation vehicle. In the depicted embodiment, media program 110 resides on server 30. In other embodiments, media program 110 may reside on another server, another computing device, or computing device 40, provided that media program 110 can access database 120, user interface 130, and transportation management system 50.

Database 120 may be a repository that may be written to and/or read by media program 110. In some embodiments, media program 110 may allow a user to define a list of media content and store the list of media content to database 120. In other embodiments, database 120 may store lists of media content that were previously used by users while traveling. In the depicted embodiment, database 120 resides on server 30. In other embodiments, database 120 may reside on another server, another computing device, or computing device 40, provided that database 120 is accessible to media program 110.

Figure 2:
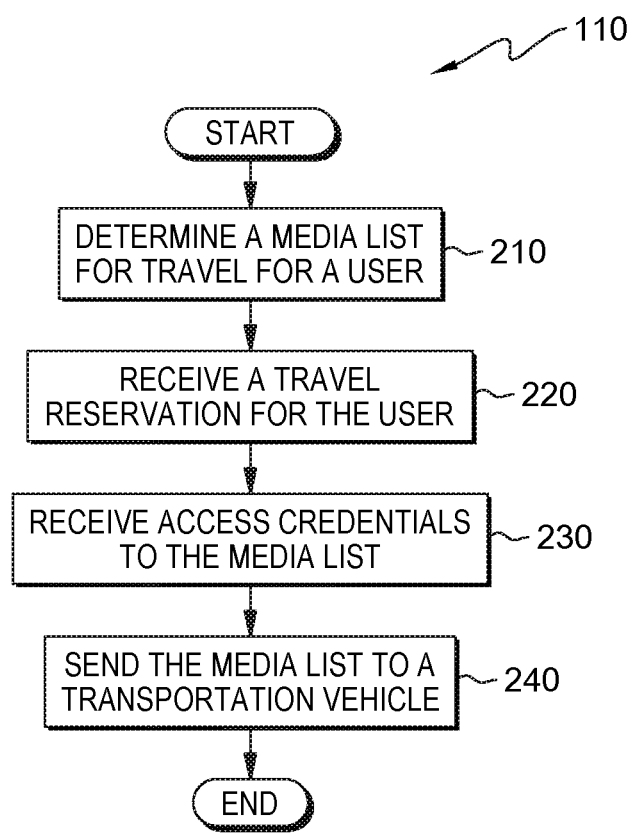
FIG. 2 depicts a flowchart of the steps of a media program, executing within the computing system of FIG. 1, for sending a media list to a transportation vehicle for a user, in accordance with an embodiment of the present invention.

FIG. 2, depicts a flowchart of the steps of a media program, executing within the computing system of FIG. 1, in accordance with an embodiment of the present invention. Media program 110 sends a media list to a transportation vehicle for a user.

Herein, the present invention focuses on accessing video on an airline flight, which is one embodiment. Other embodiments may include accessing audio, video, both audio and video, or any other type of entertainment that may be accessed on an airline flight. Additionally, in some embodiments, other modes of transportation may be used (e.g., car, bus, boat, truck, helicopter, train).

In step 210, media program 110 determines a media list for travel for a user. In some embodiments, a media list is the actual media content to be used during travel. In other embodiments, a media list is a file that contains information about media content to be used during travel, such as, but not limited to: type of media content, video name, size of video content, and length of video content. In some embodiments, the media list includes one or more additional services to be provided to the user, such as: meals, drinks, etc. In one embodiment, a user designates a travel queue (i.e., media list), via user interface 130, with a streaming video service, such as Netflix, Amazon Prime, Hulu-Plus, etc. In other embodiments, media program 110 designates a travel media list for the user, based on media content that the user likes. Media content that the user likes can be determined from searching, for example: previously stored media lists in database 120; the user's profile on a social media server (not shown); and the user's profile within the streaming video service.

In some embodiments, the media list is size constrained (e.g., four or eight GB of video). In other embodiments, the media list is not size constrained and can contain an arbitrarily high amount of media content.

In step 220, media program 110 receives a travel reservation for the user. The travel reservation may include, but not limited to: the departure location and destination location, the particular flight, and the seat assignment for the particular flight. In some embodiments, the departure and destination information is important when dealing with international flights that may have regional conflicts when it comes to certain movies and television shows. In one embodiment, media program 110 receives a travel reservation for the user, simultaneously, when the user makes a flight reservation on transportation management system 50 via user interface 130. In other embodiments, media program 110 receives a travel reservation for the user subsequent to the user making a flight reservation on transportation management system 50 via user interface 130. In some embodiments, the travel reservation is stored in database 120.

In one embodiment, media program 110 receives the travel reservation directly through user interface 130. In other embodiments, media program retrieves the travel reservation from transportation management system 50. In some embodiments, media program 110 retrieves the travel reservation from database 120.

In step 230, media program 110 determines a transportation vehicle associated with the travel reservation. In one embodiment, media program 110 determines the transportation vehicle, including the location of the transportation vehicle. In other embodiments, media program 110 determines, only, the type of transportation vehicle that will be used to accommodate the travel reservation until the specific transportation vehicle to be used is made available. For example, if the transportation vehicle is an aircraft, but the specific aircraft to be used is not made available until two weeks before the travel date, then media program 110 determines that the transportation vehicle is an aircraft and will, later, determine the specific aircraft to be used when made available.

In step 240, media program 110 receives access credentials to the media list. In some embodiments, the access credentials are credentials to a list of media. In other embodiments, the access credentials are credentials to access a subscription of a streaming server of the user. When the user makes the flight reservation, or subsequent to making the flight reservation, the user provides, or sets, an authorization code (i.e., access credentials), which allows media program 110 to access the media list from the streaming video service. The access credentials may be stored to database 120. In one embodiment, media program 110 receives the access credentials to the media list and stores the association of the media list and the user to database 120.

In step 250, media program 110 uses the access credentials to access the media list. In some embodiments, media program 110 accesses the media list associated with the access credentials and associates the media list with the user, who will be a passenger on an airline flight.

In step 260, media program 110 sends the media list to a transportation vehicle. The media list becomes available for use by the user associated with the media list. A transportation vehicle can be any type of vehicle that can transport a person from a starting point to a finishing point. Examples of a transportation vehicle include, but are not limited to: a car, truck, bus, train, airplane, and helicopter, and boat. In one embodiment, before media program 110 sends the media list to the transportation vehicle, the user may alter the media list until boarding of the flight begins. In other embodiments, the user may not alter the media list after the user initially designates media content for the media list. In some embodiments, the user may not alter the media list after a predetermined time period after designating the media list (e.g., one week after designating the media list). In other embodiments, the user may not alter the media list after a predetermined time period before boarding of the flight begins (e.g., after 12 hours before the boarding of the flight is scheduled).

In one embodiment, media program 110 makes the media list available to a transportation service provider. In other embodiments, prior to the flight, media program 110 loads the video content on the media list directly from the streaming video service's server onto the airplane's (or other vehicle's) entertainment server. In some embodiments, prior to the flight, the media list may be transported to a location where the video content on the media list can be uploaded onto the airplane's (or other vehicle's) entertainment server. Such an embodiment is done in cases where it is inconvenient or impossible to load video directly from the streaming video service's server onto the airplane's (or other vehicle's) entertainment server. In other embodiments, prior to the flight, the media list is placed onto aircraft storage. Aircraft storage may be solid state, hard disks, or any other aircraft-housed storage, such as a platform housed on transportation management system 50. In some embodiments, media program 110 loads the entire (size-constrained) media list onto the aircraft storage. In other embodiments, a subset of the, arbitrarily large, media list is loaded onto the aircraft storage. For example, if a user has 60 GB of video in a media list and an airline policy stipulates that no more than 8 GB may be loaded, then the video content corresponding to up to 8 GB will be loaded onto the aircraft storage, accordingly, and the remaining portion may be deleted.

In one embodiment (not shown), media program 110 determines that the user has checked in for the flight before loading the media list onto the aircraft storage. In some embodiments (not shown), the user watches personal videos from the user's media list while in flight. In other embodiments, the media list is associated with the user's seat on the airline. In some embodiments, the user logs into a streaming server from any seat on the airplane, using the access credentials. The user would have access to any of the content on the media list that was uploaded in association with the user's account. In other embodiments, the content may only be viewed by the user, e.g., the video file itself has a password available only to the user. In some embodiments, the content in only viewable a predetermined period of time, having and expiration date/time.

Figure 3:
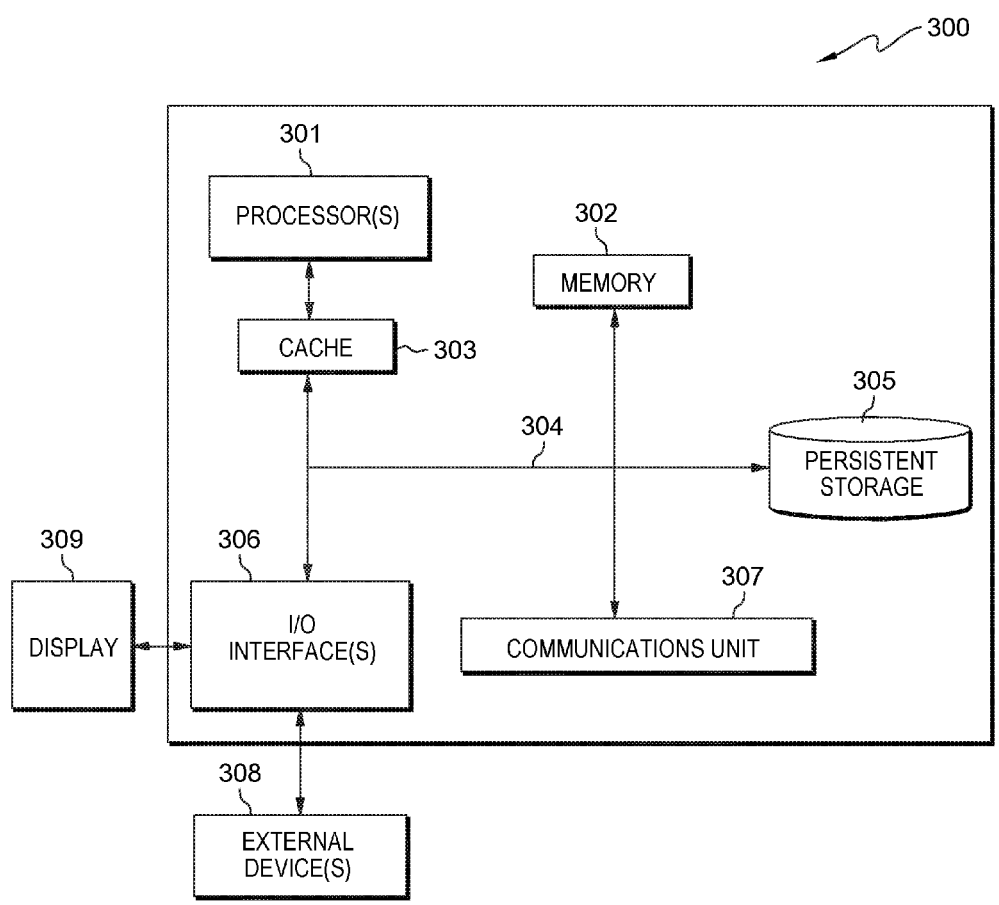
FIG. 3 depicts a block diagram of components of the servers and/or the computing device of FIG. 1, in accordance with an embodiment of the present invention.

FIG. 3 depicts computer system 300, which is an example of a system that includes components of server 30, computing device 40, and/or transportation management system 50. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307. Media program 110 and database 120 may be downloaded to persistent storage 305 of server 30 through communications unit 307 of server 30. User interface 130 may be downloaded to persistent storage 305 of computing device 40 through communications unit 307 of computing device 40.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., media program 110 and database 120, can be stored on such portable computer readable storage media and can be loaded onto persistent storage 305 of server 30 via I/O interface(s) 306 of server 30. Software and data used to practice embodiments of the present invention, e.g., user interface 130, can be stored on such portable computer readable storage media and can be loaded onto persistent storage 305 of computing device 40 via I/O interface(s) 306 of computing device 40. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for sending a media list to a transportation vehicle for a user, the method comprising:
   determining, by one or more processors, a media list for travel for a user, wherein:
      the media list includes at least one media content item;
      the media list has associated access credentials that are set by the user; and
      the at least one media content item is a size smaller than a maximum amount of content requirement;
   receiving, by one or more processors, a travel reservation for the user, wherein the travel reservation includes, at least, a departure location, destination location, and a seat assigned to the user;
   determining, by one or more processors, a transportation vehicle associated with the travel reservation;
   receiving, by one or more processors, the access credentials to the media list;
   using, by one or more processors, the access credentials to access the media list;
   prior to sending the media list to the transportation vehicle, determining, by one or more processors, the user checked in for the travel reservation;
   sending, by one or more processors, the media list to the transportation vehicle, wherein:
      the media list is associated with the user;
      the media list is accessible to the user;
      sending the media list to the transportation vehicle includes storing content of the media list on the transportation vehicle and limiting content playback to the seat assigned to the user; and
      sending the media list to the transportation vehicle further comprises:
         determining, by one or more processors, the transportation vehicle has the maximum amount of content requirement,
         determining, by one or more processors, the media list exceeds the maximum amount of content requirement, and
         subsequent to determining that the media list exceeds the maximum amount of content requirement, loading, by one or more processors, a subset of the media list, including the at least one media content item, wherein the subset does not exceed the maximum amount of content requirement;
   receiving, by one or more processors, a request to access media content of the media list associated with the user from a streaming device, wherein receiving a request to access the media content of the media list includes the user logging into a streaming server from the seat assigned to the user on the transportation vehicle using the access credentials, and wherein the user has access to any of the media content of the media list that was sent to the transportation vehicle; and
   presenting, by one or more processors, the media content to the streaming device.

\* \* \* \* \*